(12) United States Patent
Rosen

(10) Patent No.: US 12,044,347 B2
(45) Date of Patent: Jul. 23, 2024

(54) METHOD FOR POSITIONING AND/OR COMMUNICATING WITH A PIG

(71) Applicant: ROSEN SWISS AG, Stans (CH)

(72) Inventor: Patrik Rosen, Meppen (DE)

(73) Assignee: ROSEN SWISS AG, Stans (CH)

( * ) Notice: Subject to any disclaimer, the term of this patent is extended or adjusted under 35 U.S.C. 154(b) by 263 days.

(21) Appl. No.: 17/613,379

(22) PCT Filed: May 20, 2020

(86) PCT No.: PCT/EP2020/064193
§ 371 (c)(1),
(2) Date: Nov. 22, 2021

(87) PCT Pub. No.: WO2020/234415
PCT Pub. Date: Nov. 26, 2020

(65) Prior Publication Data
US 2022/0214001 A1 Jul. 7, 2022

(30) Foreign Application Priority Data
May 20, 2019 (DE) .......................... 102019113381.5

(51) Int. Cl.
*F16L 55/48* (2006.01)
*F16L 101/12* (2006.01)
*F16L 101/30* (2006.01)
*G01S 11/14* (2006.01)

(52) U.S. Cl.
CPC .............. *F16L 55/48* (2013.01); *G01S 11/14* (2013.01); *F16L 2101/12* (2013.01); *F16L 2101/30* (2013.01)

(58) Field of Classification Search
CPC ... F16L 55/48; F16L 2101/12; F16L 2101/30; G01S 11/14
See application file for complete search history.

(56) References Cited

U.S. PATENT DOCUMENTS

2022/0214001 A1* 7/2022 Rosen ................. G01S 11/14

FOREIGN PATENT DOCUMENTS

| CA | 3140984 A1 * | 11/2020 | ............. F16L 55/48 |
| DE | 3139733 A1 | 4/1983 | |
| DE | 19545185 A1 | 2/1997 | |
| DE | 10338950 A1 | 6/2005 | |

(Continued)

OTHER PUBLICATIONS

DE-102013018114 Translation. (Year: 2015).*

*Primary Examiner* — Daniel Pihulic
(74) *Attorney, Agent, or Firm* — Husch Blackwell LLP

(57) ABSTRACT

A method for positioning and/or communicating with a pig located in a hollow and elongate object is provided. The object is preferably a pipeline. At least one inner transducer of the pig is arranged on the inner side of a wall of the object. At least one outer transducer is arranged on an outer side of the wall of the object, and at least one ultrasound signal is generated in the wall. By means of an evaluation and/or communication device, and from the amplitude of the ultrasound signal preferably generated by the inner transducer, and in particular from a change of the amplitude, a relative position and/or a spacing A between the two transducers is derived and/or a communication is initiated via the transducers.

19 Claims, 10 Drawing Sheets

(56) References Cited

FOREIGN PATENT DOCUMENTS

| DE | 102013018114 A1 | * | 5/2015 | ............... | G01B 7/10 |
| DE | 102019113381 A1 | * | 11/2020 | ............... | F16L 55/48 |
| EP | 3973319 A1 | * | 3/2022 | ............... | F16L 55/48 |
| WO | 2011079384 A1 | | 7/2011 | | |
| WO | WO-2020234415 A1 | * | 11/2020 | ............... | F16L 55/48 |

* cited by examiner

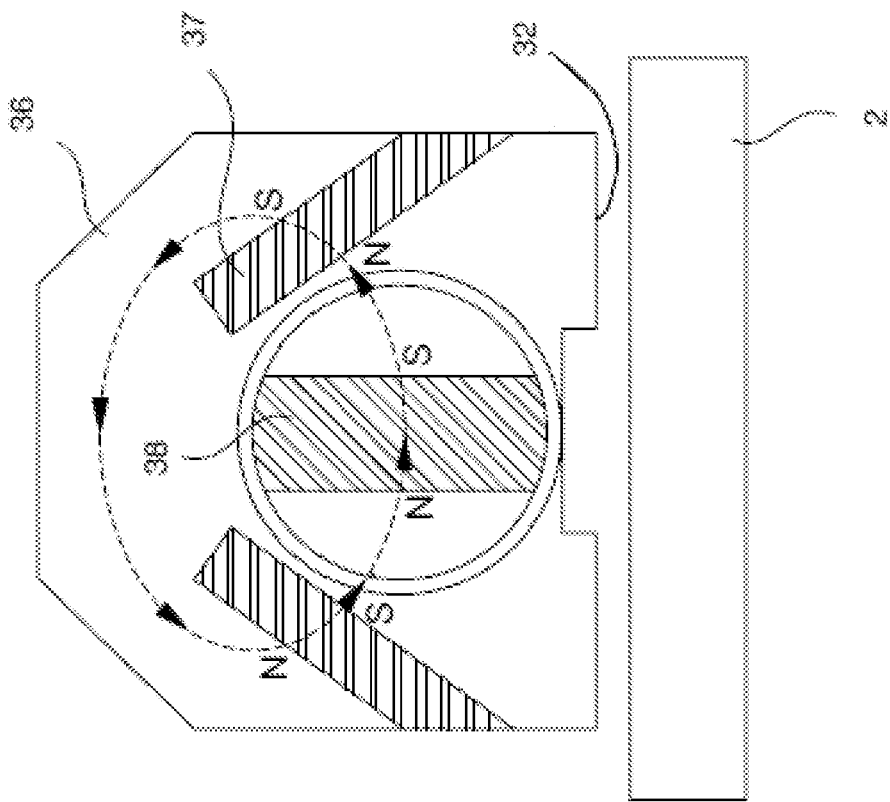
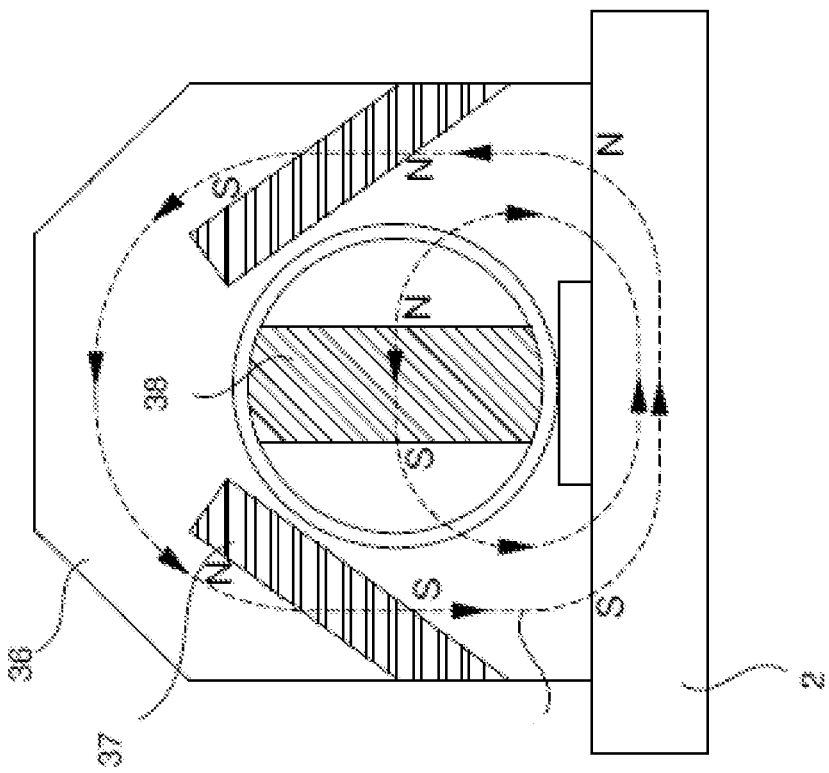
Fig. 10

METHOD FOR POSITIONING AND/OR COMMUNICATING WITH A PIG

CROSS REFERENCE

This application claims priority to PCT Application No. PCT/EP2020/064193, filed May 20, 2020, which itself claims priority to German Application No. 10 2019 113381.5, filed May 20, 2019, the entirety of both of which are hereby incorporated by reference.

FIELD OF THE INVENTION

The invention relates to a method for positioning and/or communicating with a pig located in a hollow and elongate object, preferably a pipeline, and to an associated device.

BACKGROUND OF THE INVENTION

It is currently known to use low-frequency electromagnetic waves to transmit information from a pig located in a pipeline to a receiving site present outside on the pipeline. Depending on the wall thickness of the pipeline, distances of up to 10 m can be overcome here. Greater wall thicknesses lead to impracticably large transmitters in the pipeline and correspondingly voluminous receivers. An additional disadvantage is that, at the frequencies used, in the two-digit Hertz range, only very low transfer rates are achieved.

Because of the large number of older pipelines which are increasingly in need of repair, there has also been in increase in the demand for the capability to steer repairs in the pipeline in a targeted manner from outside. For this purpose, higher transfer rates and an accurate positioning of the tool and, associated therewith, an improved steering of any necessary measures are necessary.

BRIEF SUMMARY OF THE INVENTION

In the method according to the invention, at least one inner transducer is arranged on the inner side of a wall of the object, wherein at least one outer transducer is arranged on an outer side of a wall of the object, and at least one ultrasound signal is generated in the wall. Moreover, by means of an evaluation and/or communication device, from the amplitude of the ultrasound signal preferably generated by the inner transducer, in particular from or on the basis of a change of the amplitude, a relative position and/or a spacing between the two transducers is derived and/or a communication is initiated via the transducers. Thus, transducers present on a pig designed as an inspection pig, for example, can be used not only for the inspection but also for positioning the pig. At the same time, the use of the high-frequency ultrasound waves, in comparison to the method used so far in the prior art, enables an improved, more redundant and more accurate evaluation as well as clearly higher transfer rates in a communication.

The aim is also achieved by a method which can in particular also comprise aforementioned features, to the effect that at least two outer transducers are arranged on an outer side of the wall of the object, spaced apart from one another in a longitudinal direction of the object, and an ultrasound signal is generated in the wall, wherein, by means of an evaluation and/or communication device, a relative position and/or a spacing of the inner transducer with respect to the outer transducers is derived from at least one travel time difference of the ultrasound signal preferably generated by the inner transducer and/or a communication is initiated via the transducers. The travel time difference is the time that elapses between the arrival time of the signals at the first non-transmitting transducer and at the second non-transmitting transducer. In particular, in this way, the travel time difference between the signal coming from the inner transducer to a first outer transducer, at the front in a pipeline direction, and to a second rear outer transducer (or vice versa) is measured. To the extent that no difference between the travel times of the signals is measured, the pig, taking into consideration the corresponding measurement inaccuracies, is located exactly between the two outer transducers.

Preferably, the ultrasound signal sent or generated by the inner transducer can contain a time stamp which is read out from the signal by an evaluation unit on the outer side of the pipe wall or pipeline from the signal. In the case of synchronized timers of pig and outer evaluation device, the travel time measurement is improved thereby, in particular in the case of signals transmitted continuously or at short intervals or ultrasound waves generated in the wall.

In general, an arrangement on the inner or outer side of the wall is understood to mean an arrangement (of the transducer) close to the wall, wherein this close arrangement can be an arrangement in contact with the wall or an arrangement provided with a slight spacing, in particular for a coupling medium. The transducers can be designed as transmitters, receivers or transceivers (also as transmitter, receiver or transceiver transducers).

For a duplex connection, in which it is possible to communicate simultaneously both in the direction from inside to outside and also from outside to inside via the wall, the pig can also comprise a transmitter and an additional receiver transducer. Correspondingly, on the outer side, a pair of transmitter and receiver transducers are then also present. For a variant, in which the measurement of the travel time difference is necessary, correspondingly at least one pair of transmitter and receiver transducers at a first position and, offset with respect thereto in longitudinal direction of the object, at least one additional receiver transducer or also a transmitter transducer and a receiver transducer are present.

In addition to piezoelectric transducers which, however, necessitate a coupling medium and which to that extent can preferably be used for fluid-filled lines or off-shore in the ocean, in particular for gas-filled lines, the use of electromagnetic ultrasound transducers is advantageous (below EMUS transducers, EMAT transducers or EMAT transducers).

According to an additional embodiment of the invention, the ultrasound signal, an additional ultrasound signal and/or a low-frequency electromagnetic signal is/are introduced from outside into the wall, said signal is received by the inner transducer, evaluated correspondingly by and on the pig, whereafter the pig transitions to a slow travel or to a stop. This is particularly advantageous when the pig approaches the region of interest and must first must be brought out of its travel, associated with high dynamics, with the flow present in the pipeline. Slow travel here is understood to mean travel at a speed of preferably less than 10 cm/s.

For slow travel or stopping and for positioning in the pipeline, various possibilities are known from the prior art. In particular, a bypass through the pig can be opened or closed, so that the propulsion is decelerated or accelerated and a brake is actuated. It is also possible, by switching on active drive means such as, for example, wheels, impeller wheels, impellers or propellers, which then work with or against the flow in the medium, to slow or stop the pig or to move it ahead.

The transition from passive drive through the medium to a stop or to slow travel represents a transition into a positioning mode and is advantageous for bringing the pig in a controlled manner and more simply to its intended position.

For communication, in particular in this positioning mode or slow travel, the frequency and/or the phase of the ultrasound signal or of multiple additional ultrasound signals is/are varied for transmission of information between the at least one outer transducer and the at least inner transducer. With a frequency shift keying and/or phase shift keying of the ultrasound waves, clearly higher transmission rates in the range of one kilobyte per second can be reached, so that in the positioning mode, in which the pig can be moved, for example, in a "stop & go" mode, the actual communication occurs between the transducers present inside and outside and respectively the connected evaluation units, steering units and any other units provided for the control. Additionally, preferably, the beginning of the communication and the communication itself, i.e., the transmission of information on the status of the pig and of the pipeline occurs as a function of the amplitude and/or the travel time difference of the signal occurs, in order to prevent any communication errors. Already in the slow-travel phase, information in the form of sensor data, for example, pressure, differential pressure, odometer and/or camera data can be transmitted from the interior of the object outward, so that an optimal steering of the pig in the desired region of the object can be better monitored and steered or regulated from the outside.

In general, a travel time difference can also be "zero," i.e., a difference results, which, taking into consideration any measurement inaccuracies, is identical with regard to a transducer placed upstream and a transducer placed downstream.

Preferably, on the basis of an amplitude of the ultrasound signal, a change of the amplitude or of the signal, its maximum and/or a deviation therefrom, a positioning signal is generated for the pig or for a travelling unit comprising the at least one outer transducer and which can be moved along on the object. The generation of the positioning signal can be carried out both on the sides of the pig and also preferably on the outer side of the object. Thus, for example, in an amplitude acquisition of the ultrasound signal, it is assumed that if the amplitude of the ultrasound signal generated by an inner transducer decreases again, the closest spacing between the transducers has been reached and left again. In the preliminary stage before tests, for example, as a function of the gradients of the signal, it is possible to estimate what sort of decrease of the amplitude is associated with which spacing of the transducers, so that in the case of application the pig can appropriately be positioned. Thus, for example, for an accurate positioning of the pig at a desired site, the spacing of this pipeline site to be inspected, maintained or repaired in relation to the transducer can be established, and the corresponding offset is to be taken into consideration by decreasing the amplitude and the evaluation thereof.

Alternatively or additionally, on the basis of the travel time difference, a minimal and/or a no longer measurable travel time difference, a positioning signal is generated not only for the pig but also for a travelling unit comprising the at least one outer transducer and which can be moved along on the object. If the travel time differences increase again, the pig is correspondingly moved downstream out of its central position, or moved upstream in the case of active drive means. By means of this information, a steering from outside to the desired position is also possible.

Correspondingly, the pig is designed so that, on the basis of the positioning signal, active or passive drive means of the pig are actuated, in order to be moved or to move with or against a fluid flow present in the object.

In order to acquire a plurality of data during pig travel and in order to steer the pig in a targeted manner also over longer distances, it is advantageous if the amplitude and/or the travel time difference, for the positioning of at least one preferably robotic travelling unit to be moved along with the pig on the outside on the pipeline, in particular on said pipeline, is also evaluated in particular using satellite-assisted navigation data. Thereby, in particular, the transmission of camera information is improved, which can then be further transmitted outside via radio, for example. In particular, the pig is guided by means of the positioning signals to a desired position, in which the wall is examined, cleaned, maintained and/or repaired. Thus, for example, it is possible, in particular when two outer transducers which have a spacing of, for example, 10 or 20 m from one another are used, to position in the center a repair pig which can continue to keep the pipeline operational by opening a bypass. Such a repair pig can comprise means for pumping dry an outer inner-wall-side region (located in the pipeline) located preferably radially with respect to the bypass, in order to create the possibility there of working on the pipeline. Thereby, the internal pressure of the pipeline and the pressure differential, via the bypass of the repair pig arranged in the pipeline, can be used to promote the pumping dry. For this purpose, in particular, a Venturi nozzle in the bypass can be used. Alternatively or additionally, the pig can also comprise means by means of which the kinetic energy of a fluid flowing in the pipeline due to the differential pressure can be used, such as a turbine or a propeller, in particular as impeller arranged in the bypass. By these means, the kinetic energy of the flowing fluid can be converted into a mechanical and/or electrical energy and be made available for the operation of the repair pig, in particular for the operation of a pump for pumping dry an outer inner wall-side region of the pipeline (located in the pipeline), preferably located radially with respect to the bypass. Alternatively or additionally, the pig can comprise a container with a flushing fluid, with which the region can be filled after the pumping dry or for fluid exchange. Thereby, in the region, an environment advantageous for the repair work to be performed subsequently can be created.

In particular, the examination, cleaning, maintenance and/or repair, on the basis of information received by the inner transducer, can be regulated and/or steered from outside.

The aim set out in the introduction is also achieved by a system for carrying out the aforementioned method, which comprises a pig to be arranged in a hollow and elongate object, preferably in a pipeline, wherein the system includes at least one inner transducer to be arranged on the inner side of the object and moreover at least one outer transducer to be arranged on the outer side of the wall of the object, and wherein the multi-part system is designed for the generation of at least one ultrasound signal in the wall and comprises an evaluation and/or communication device for evaluating the amplitude and/or, in the case of at least two outer transducers, for determining travel time differences of the ultrasound signal preferably generated by the inner transducer and for determining a spacing and/or a relative position of the transducers with respect to one another. In particular, from the amplitude and in particular from a change of the amplitude and/or from the travel time difference, when two outer transducers are used, a relative position and/or a spacing between the at least two transducers and subsequently a positioning signal for the pig is/are derived and/or a communication is initiated. The evaluation and communication device is designed, in particular, for generating positioning signals for the pig.

The evaluation and/or communication device can be part of the pig and it can also be arranged alone on the outside of the object, in particular of the pipeline. In particular, both the pig and the parts of the system located on the outside comprise means for actuating the transducers and also for generating and for receiving frequency and phase changes to be imprinted on the ultrasound wave as well as the interpretation thereof. In addition, the pig and the parts of the system arranged outside comprise corresponding transducer electronics for actuating the transducers and for receiving corresponding information from the transducer. Also, parts of the system preferably located outside are designed so as to interpret data received from the pig, to generate corresponding signals for positioning the pig in the pipeline, and overall to regulate, steer and/or monitor the procedure of positioning the pig in the pipeline, wherein this can occur in interaction with an operator operating, for example, an associated PC.

As described above, the inner and also the outer transducer(s) can be designed as transmitters and/or receivers. Preferably, they are transducers designed as electromagnetic ultrasound transducers (EMUS transducers) or as piezoelectric transducers.

In transducers designed as EMAT transducers or EMUS transducers, the coils preferably have a meandering shape. In particular, a design of the coils and electronics for generating Lamb waves has the advantage that this also allows an arrangement of transducers with offset in circumferential direction, since the ultrasound wave also propagates in the circumferential direction of the pipe. The pig comprises, in particular, passive or active drive means, wherein braking means, means influencing the cross section and then correspondingly the propulsion in the pipeline are classed among the passive drive means, in particular for bracing in the pipe. Active drive means are, for example, roller wheels, chains or other means actively bracing on the wall and ensuring the propulsion as well as drive means moved in the fluid, such as impeller wheels, propellers or impellers.

Preferably, the pig comprises a braking means in the form of a spindle-driven clamping device. By means of a spindle drive, a rotatory movement of a motor can be simply converted into a translation movement of a braking element of the braking means relative to a pipeline wall. For moving the braking element, the braking means can comprise, in particular, a scissor gear. Particularly preferably, the spindle drive is implemented to be self-locking. As a result, it is possible that, after a braking element has been brought onto the pipeline wall, it remains on said pipeline wall. A motor is only necessary for moving the braking element for immobilizing or releasing the pig. Thereby, the load on the motor and its energy consumption are reduced.

Particularly preferably, the braking means comprises a preferably mechanically acting overload protection. While, during normal operation, it is desirable to be able to brake the pig reliably and with little or no energy consumption and in particular to be able to immobilize it at a certain site in a pipeline, this is problematic in the case of failure of the motor which moves the braking element, failure of a control actuating the braking means and/or failure of the communication means of the pig. A pig which is permanently stuck in a pipeline represents an enormous nuisance and it can be retrieved or circumvented only at very high expense. By means of an overload protection, the brake can be released, in that the pressure in the pipeline is increased until the overload protection releases the braking means or removes it from the pipeline wall. Subsequently, the pig can be discharged from the pipeline by the fluid flowing in it.

Alternatively or additionally the pig comprises at least one braking means designed for magnetic interaction with the pipeline wall and/or magnetically actuatable braking means. In the case of magnetically actuatable braking means, a braking element is brought in contact with the wall of a pipeline by means of a switchable magnet. Preferably, for this purpose, the magnet at least partially forms the braking element, so that, when the magnet is activated for braking, the braking element is moved onto a pipeline wall made in particular of a ferromagnetic material. By means of the friction forces existing then between the pipeline wall and the braking element, the pig is braked and/or immobilized at a certain position in the pipeline. The switchable magnet can be implemented as an electromagnet. However, the high energy demand for the operation of an electromagnet represents a significant disadvantage for use on a pig. Preferably, the magnet is therefore formed by permanent magnets. A switchable magnet can be created by an arrangement of permanent magnets in which at least one permanent magnet is arranged so that it can be moved, in particular rotated and/or shifted. By moving the at least one movable permanent magnet, the magnetic field of the arrangement of permanent magnets can be formed differently. By a different orientation of the poles of the individual permanent magnets, the resulting magnetic field of the arrangement can be deformed in such a manner that the essential portions thereof extend nearly completely within the arrangement or a significant portion of the magnetic field extends through the pipeline wall. Thus, in a simple manner, a magnetically actuatable braking means can be created, which has a low energy demand. By moving the magnetic field through the pipeline wall, additional braking forces can be generated by eddy current effects.

The above-described braking means can also be used in other pigs, in particular also with pigs that are not part of a system according to the invention.

The system can also comprise at least one traveling unit which can be moved outside on the pipeline and which includes the outer transducer. As described above, this traveling unit can be used for continuously acquiring information transmitted by a pig moved at an in particular predeterminable speed, and in particular camera images.

In addition, in an additional embodiment according to the invention, it is advantageous if, in a method according to the invention, the magnetic field amplitudes of the magnetic fields necessary for generating the eddy currents, which are used in the EMAT transducers, are monitored with regard to the amplitude, and this is also used in addition or alternatively to the ultrasound signal amplitude for the spacing determination and the accurate positioning of the pig. Moreover, by using ultrasound and/or by generating magnetic fields and variations thereof from outside into the pipeline, an electromagnetic field can be generated on the corresponding inner-side transducers, which can be used for charging a battery of the pig or for actuating communication means.

Often, a pig moved in a pipeline comprises a plurality of transducers more or less close to one another in circumferential direction. Correspondingly, around a pipeline, a plurality of corresponding transducers can be positioned, by means of which an improved communication, in particular with higher data rates and/or transmission of higher energy quantities is enabled.

It is also advantageous if, in pipelines located, for example, in water, in particular submarine pipelines, piezoelectric transducers are used outside on the pipeline, which require a coupling medium or which use the water that is present, while then, on the inner side of the pipeline, transmitters or receivers in the form of EMAT transducers can be used. To that extent, mixed forms of the discussed transducer designs are also possible.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 10 shows a braking means for use with the pig of a system according to the invention with an arrangement of permanent magnets.

DETAILED DESCRIPTION OF THE DRAWINGS

Figure 1:
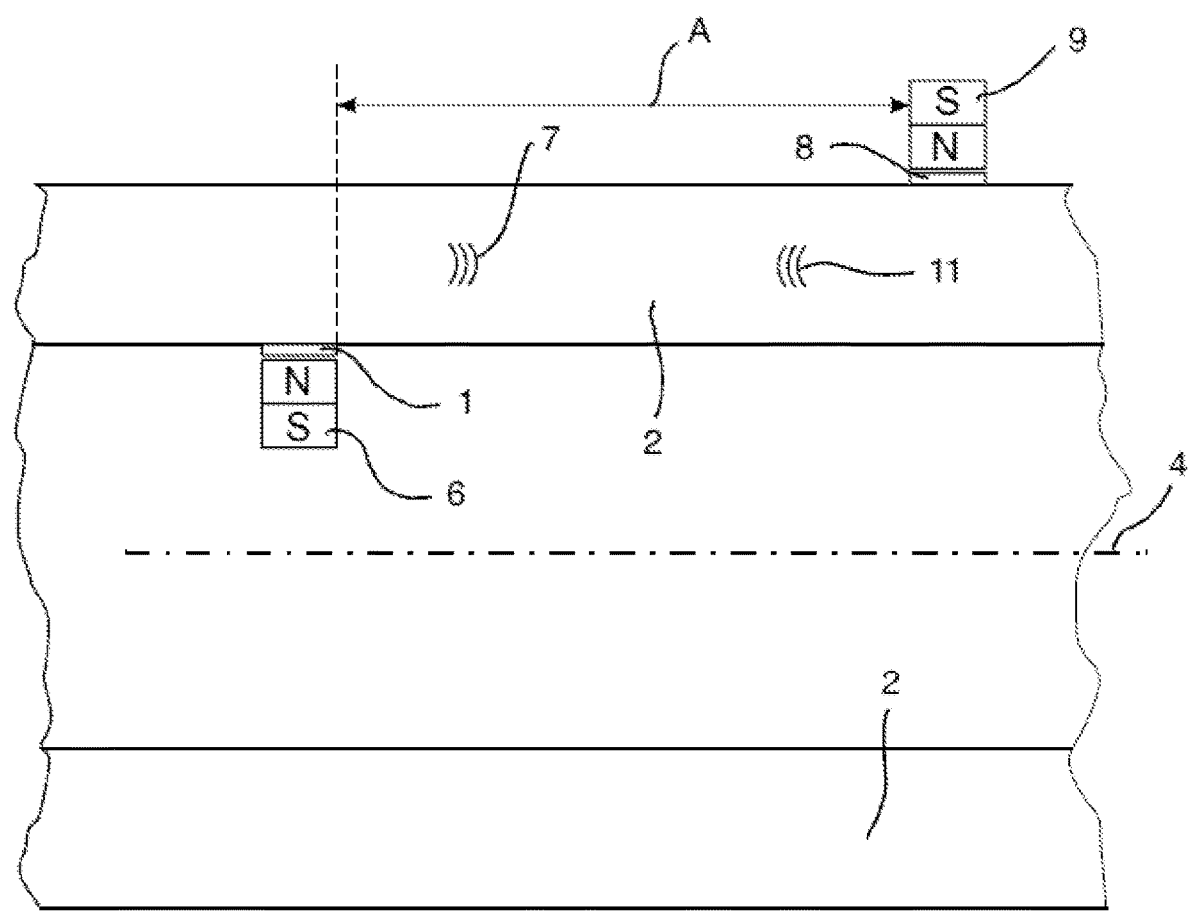
FIG. 1 shows a portion of a system according to the invention in a pipeline.

Individual technical details of the embodiment examples described below in combination with embodiment examples described above as well as with the features of the independent claims or any other claims can also be combined to form subject matters according to the invention. Where appropriate, functionally equivalent elements are provided with identical reference numerals.

According to the invention, an inner transducer 1 is arranged on the inner side of a wall 2 of the object designed as pipeline. Radially inward toward a pipeline central axis 4, a magnet 6 designated with "N" and "S" is located, which is used for the formation of a magnetic field in the wall 2 (FIG. 1). The transducer 1 designed as an EMUS transducer is equipped with a meandering coil which generates eddy currents in the metal of the wall 2, which in turn interact with the magnetic field and which generate an ultrasound wave indicated by lines 7. This ultrasound signal 7 is detected in the pipe wall by an outer EMUS transducer 8. A magnet 9 is also associated with it, as is conventionally the case for EMUS transducers. By means of the evaluation electronics associated with the outer EMUS transducer 8, the amplitude of the ultrasound signal generated by the inner transducer 1 is detected and evaluated via an evaluation device (the two devices are not represented) with regard to the amplitude and the change of the amplitude for the determination of a spacing A between the transducers. Subsequently, an additional ultrasound signal 11 is generated by the outer transducer 8, onto which information is imprinted by frequency shift keying. This information forms a positioning signal which is received by the inner transducer 1, evaluated on the associated pig, not shown, and used for positioning the pig in the pipeline.

Figure 2:
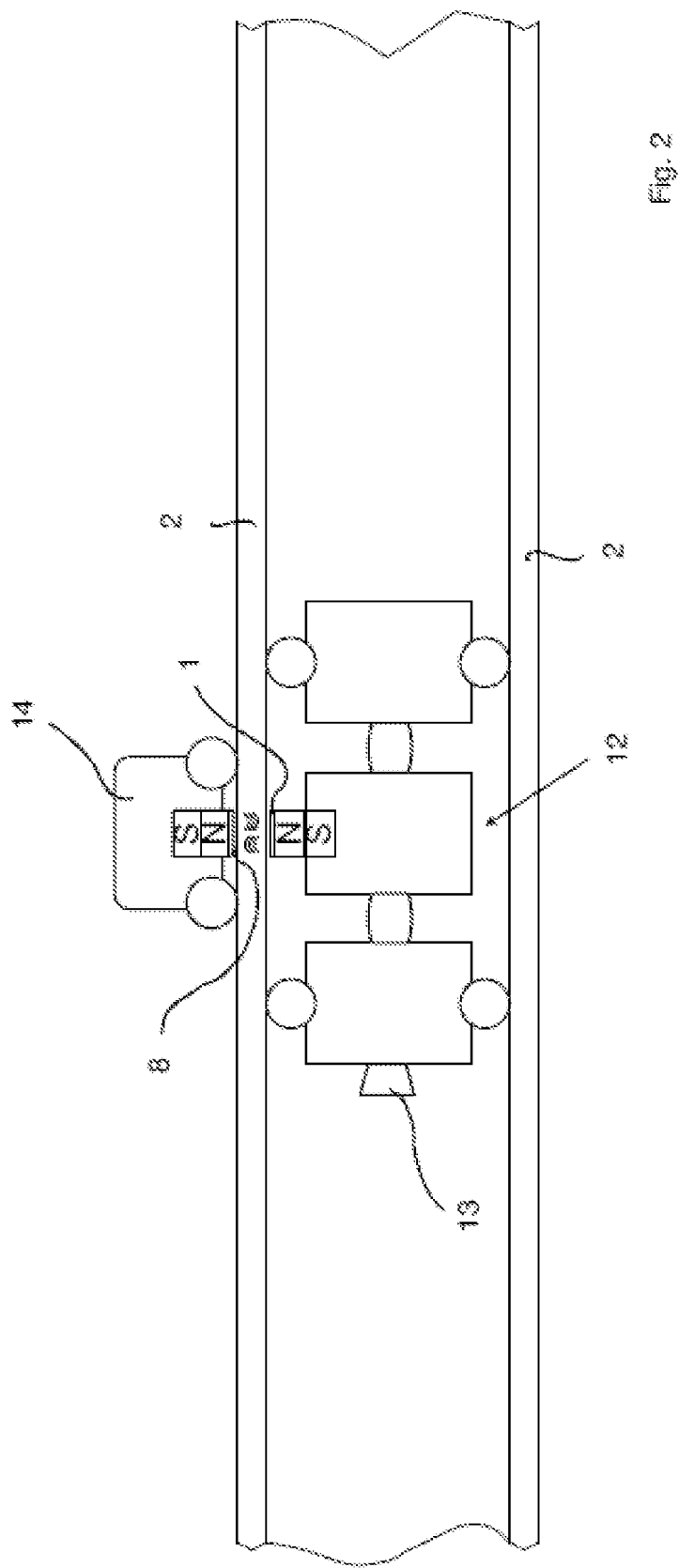
FIG. 2 shows an additional embodiment of the invention.

According to an additional embodiment example of the invention, a method according to the invention can be used, for a pig 12 located in the pipeline, which generates a plurality of data by means of a camera 13, to transmit said plurality of data via the wall 2 (FIG. 2). For this purpose, EMAT transducers 1 are again used and corresponding positioning signals or information is/are transmitted, wherein this time the positioning signals are used both for steering the pig 12 and also for actuating the travelling unit 14 moved along with it on the pipeline. Said travelling unit moves along with the pig and, by means of the communication method according to the invention, captures the camera data generated in the pipeline.

Figure 3:
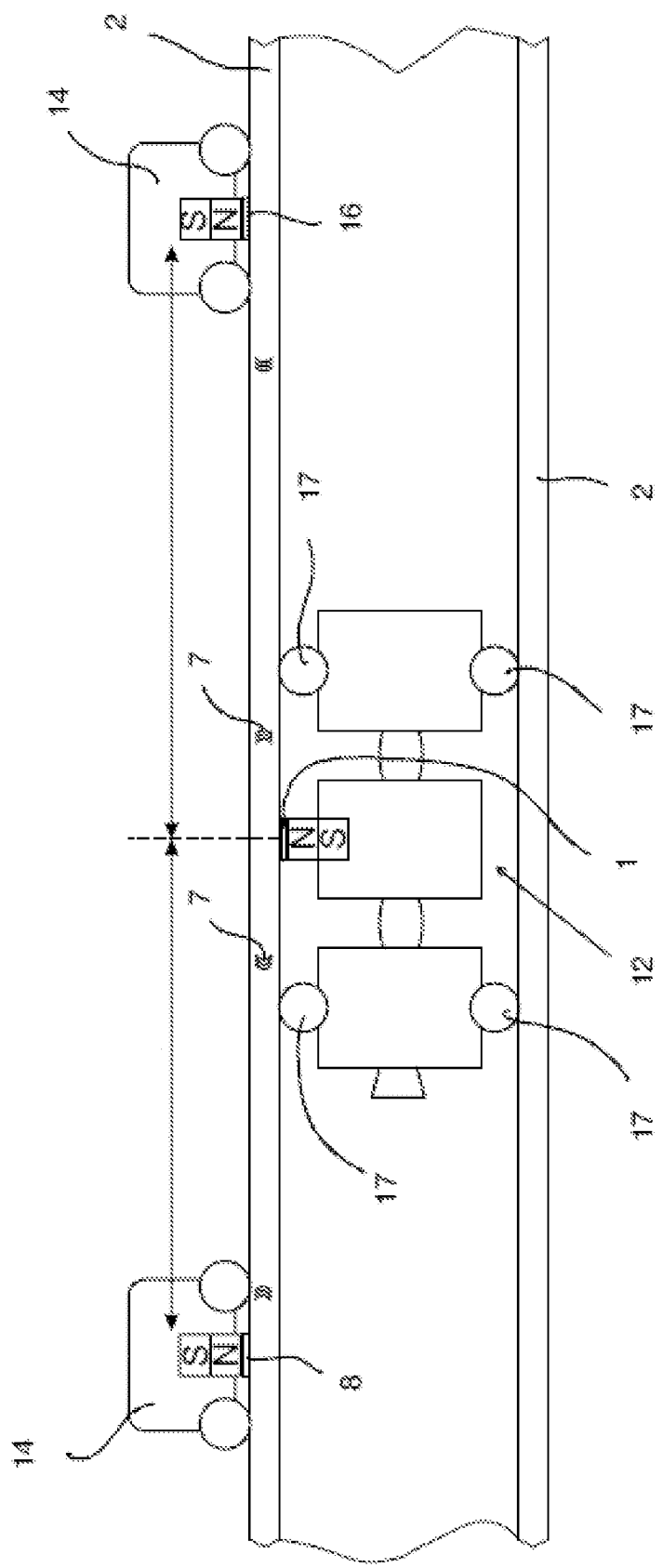
FIG. 3 shows an additional embodiment of the invention.

While, in the embodiment example according to FIG. 2, the amplitude of the ultrasound signal generated by the transducer 1 is evaluated, in additional to this, in the embodiment example according to FIG. 3, a travel time difference of the ultrasound signal transmitted by the inner transducer 1 and received both by the first outer transducer 8 and by an additional outer transducer 16 is used for positioning the pig 12, for example, by means of its drive means 17 designed as wheels and/or of the outer pigs 14. The use of ultrasound signals preferably formed as Lamb waves enables the use of travelling units 14 moving one after the other at a spacing of up to 20 m, preferably robot-controlled, on the pipeline (FIG. 3).

By the method according to the invention, using the transducers positioned in sections C and D (FIG. 4) of the pipeline, half-duplex or full-duplex communications can be implemented.

Figure 4:
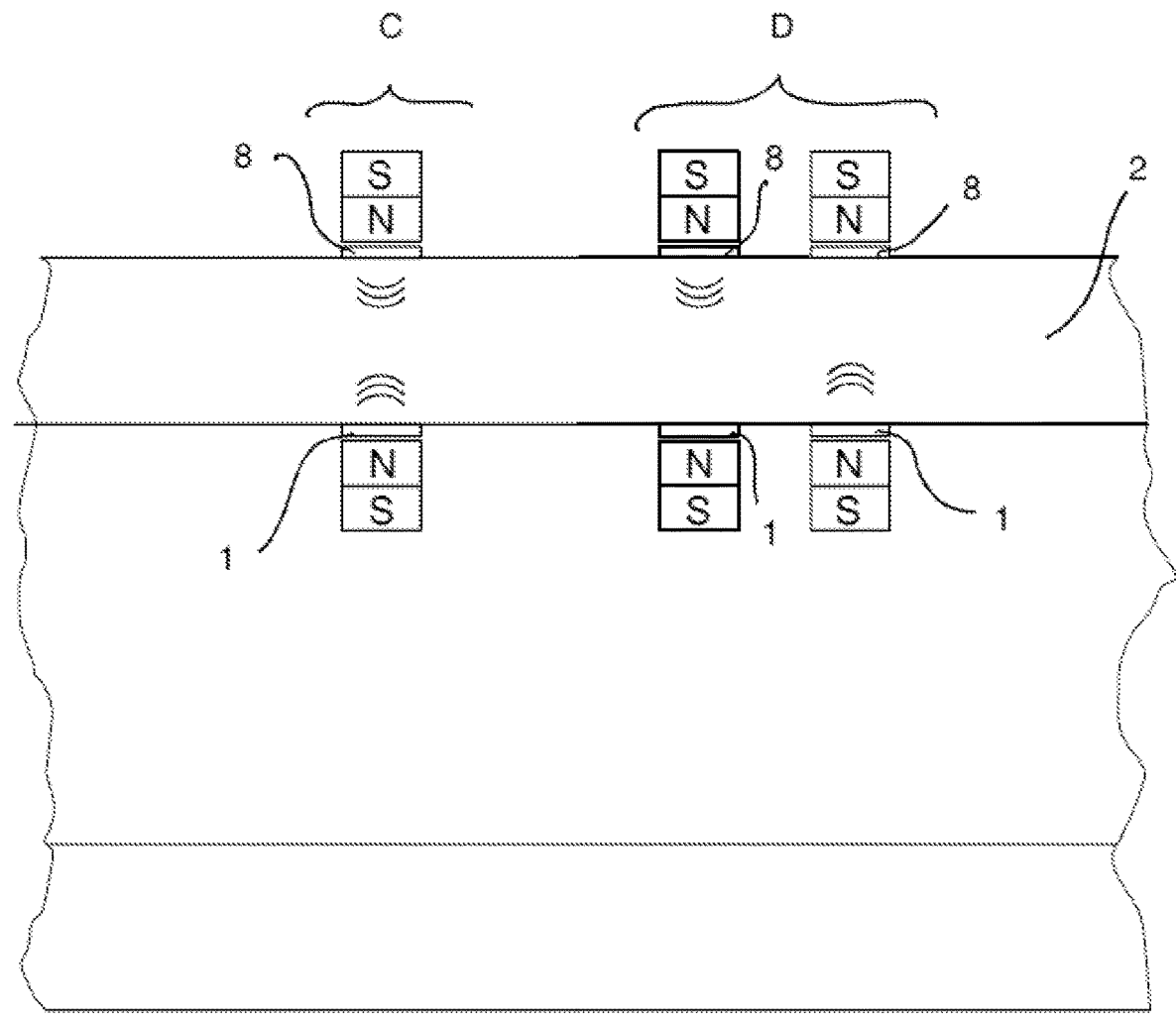
FIGS. 4, 5, and 6 show additional embodiment examples of the invention.

For half-duplex communication according to section C, an inner transducer 1 as well as an outer transducer 8 are used in each case alternatingly as transmitter or receiver. In the setup according to section D, the inner transducer 1 and the outer transducer 8 are designed permanently as transmitter or as receiver. Thus, the outer transducer 8 on the left in section D is continuously active as transmitter, while the inner transducer 1 on the left in section D is active as receiver. The two inner and outer transducers located on the right in section D are formed correspondingly differently (FIG. 4).

Figure 5:
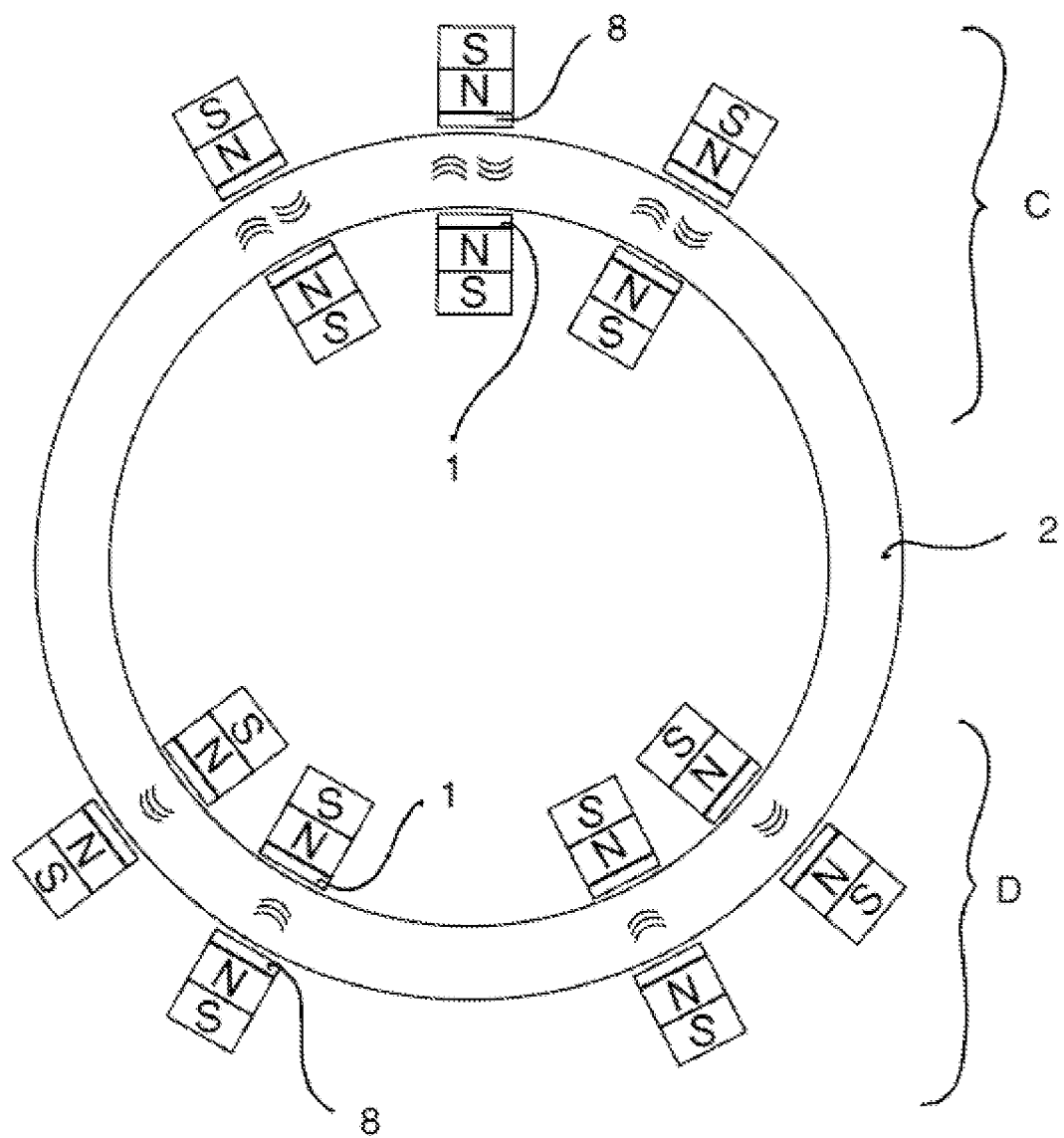

According to FIG. 5, if transducers 1 of a pig are in any case present around a circumferential region, it is preferably possible to also arrange a plurality of transducers 8 on the outer side of the object. Via said transducers, a correspondingly higher duplex operation (section D of FIG. 5 or half-duplex operation in section C is possible). Via such an arrangement of a plurality of EMAT transducers 8 or 1, charging of a battery in the interior of the pipeline can additionally occur on the pig.

Figure 6:
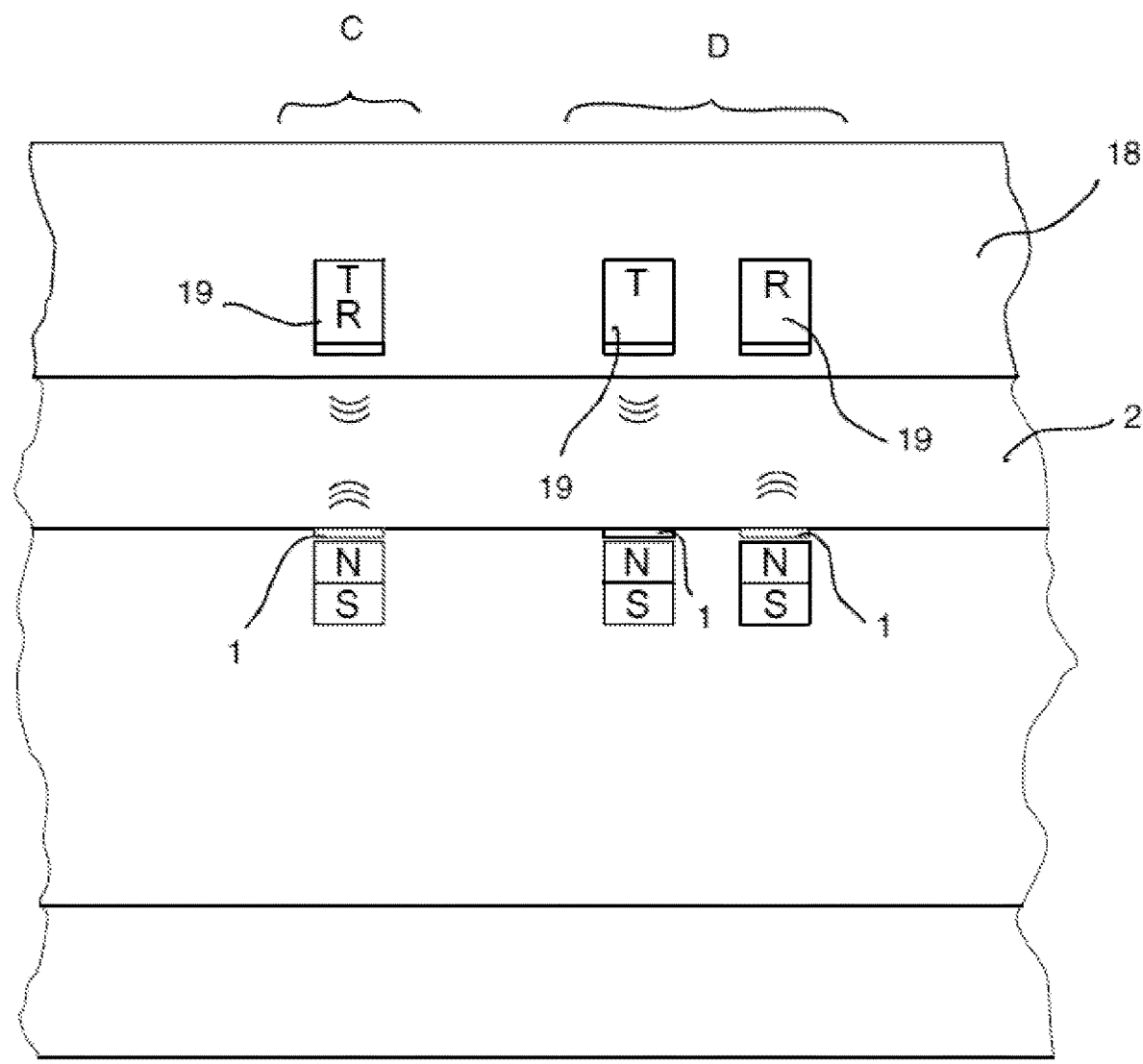

According to the embodiment example of FIG. 6, a mixed operation between EMUS transducers and piezoelectric transducers is also possible. On the outer side, in the present case, transducers 19, which are then designed as piezoelectric transducers, with a coupling medium 17 in the form of water, for example, offshore, are arranged on a wall 2. The piezoelectric transducer 19 located in section C is designed as transmitter and receiver, exactly like the transducer 1 in the form of an EMUS transducer on the inner side of the pipe wall 2. The two outer transducers 13 present in section D are designed as transmitters (left) and receivers (right), while correspondingly the transducers 1 arranged on the inner side function the other way around as receivers (left) and transmitters (right).

Figure 7:
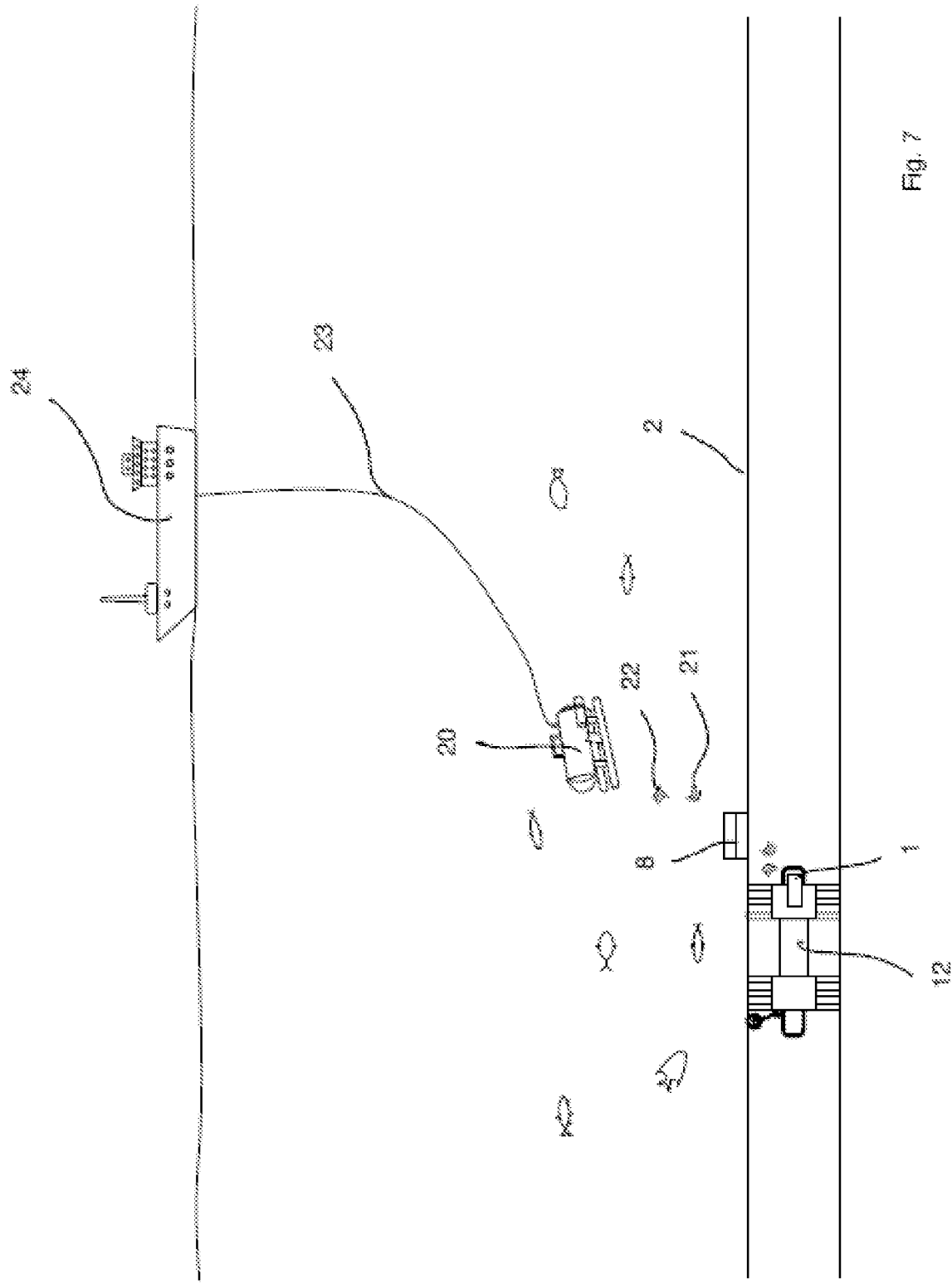
FIG. 7 shows an application example for a system according to the invention.

An application case for the method according to the invention and for a system according to the invention is illustrated in FIG. 7. In the application case, there is a pig 12 located in a pipeline, with an inner transducer 1 in a communication connection with an outer transducer 8 which is arranged on the outer side of the pipeline. The pipeline here is a submarine pipeline. The outer transducer 8 is in a communication connection with a Remotely Operated Vehicle (ROV) 20 which is indicated by the signals 21, 22. The ROV 20 is connected via a supply cable 23 with a control station 24, in the present case a ship. Thus, when the pig 12 is used in a submarine pipeline, from the control station 24 via the ROV 20 and the outer transducers 8, a communication connection through the wall 2 of the submarine pipeline to the inner transducer 1 and thus to the pig 12 can also be implemented. The use of the pig 12 in the submarine pipeline can thus be monitored and/or steered.

Figure 8:
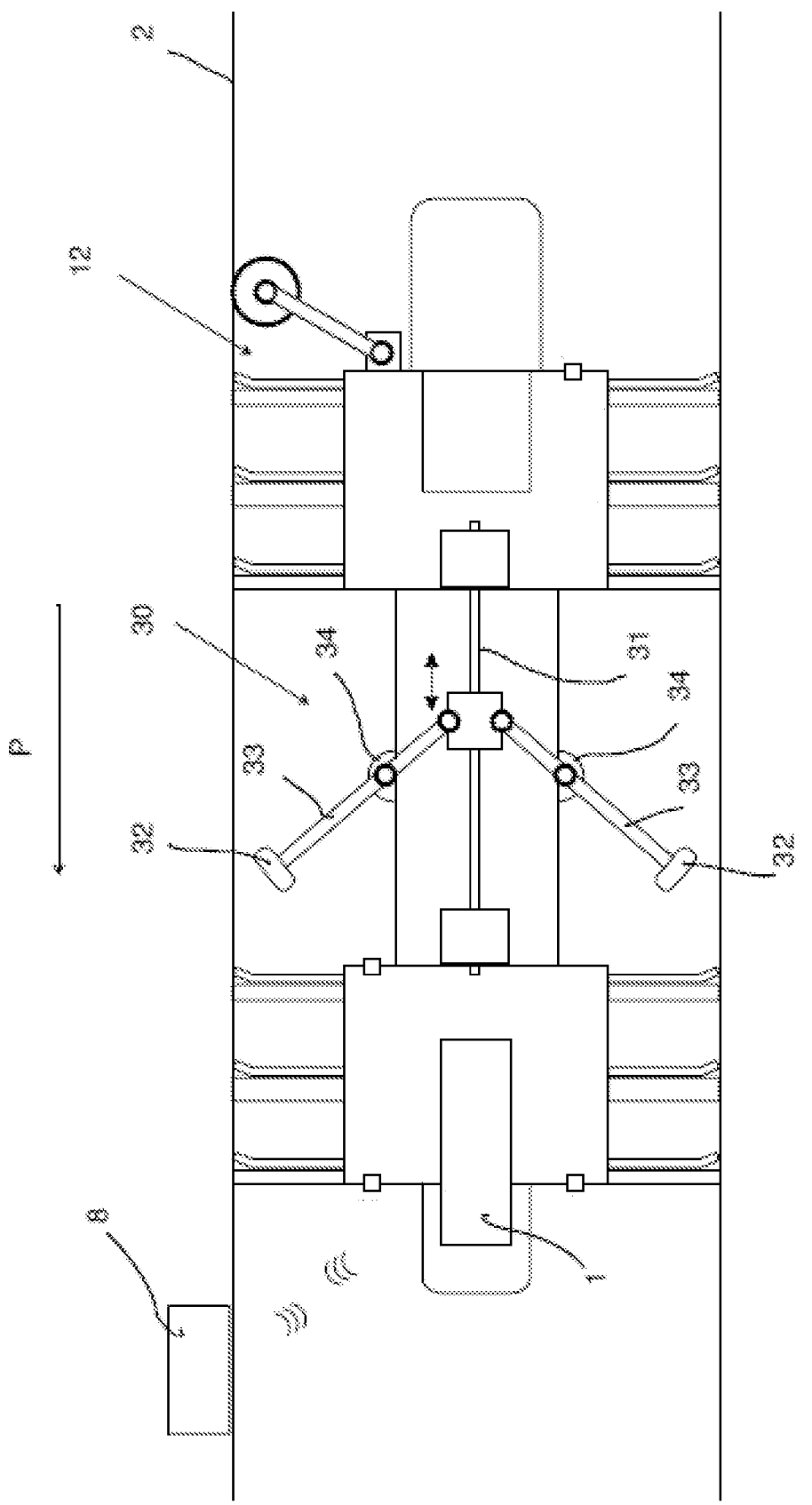
FIG. 8 shows an embodiment example of a system according to the invention with a braking means.

According to FIG. 8, the pig 12 of the system according to the invention can comprise a braking means in the form of a spindle-driven clamping device 30. Said clamping device comprises a spindle drive 31, via which braking elements 32 can be shifted in the direction of the wall 2 of a pipeline. In the embodiment according to FIG. 8, the braking elements 32 are arranged on rods 33 which, on the one hand, are secured on a part of the spindle drive 31 and, on the other hand, on a body of the pig 12 via a rotational sliding joint 34. If the braking elements 32 are brought in contact with the wall of the pipeline, they are designed to be self-locking by the arrangement according to FIG. 8. The pig 12 is moved through the pipeline in the direction of arrow P by a fluid flowing in the pipeline. In the case of braking elements 32 in contact with the wall, with an increase of the pressure differential via the pig 12 the force of the braking elements 32 on the wall of the pipeline and consequently the braking force are increased. In the embodiment example according to FIG. 8, the braking element can be provided with overload protection. If a certain adjustable or pre-established differential pressure is exceeded, the rods 33 fold. Thereby, the braking elements 32 are released from the wall. This can occur automatically as a result of the geometric design of the braking means and/or facilitated by the spindle drive 31, wherein, for this purpose, the pig 12 includes at least one sensor which acquires the differential pressure, and a control unit which evaluates the sensor and the spindle drive 31.

Figure 9:
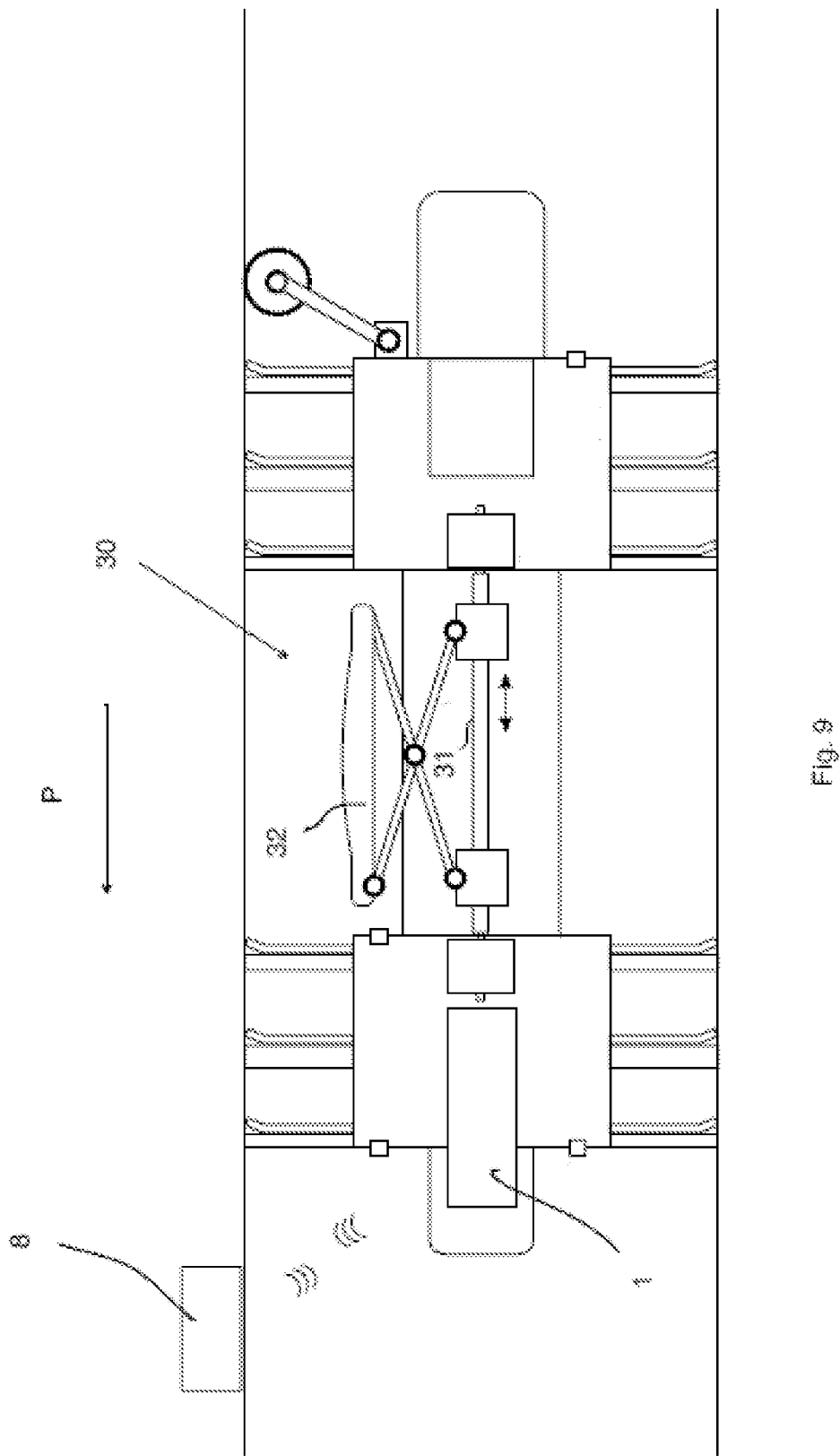
FIG. 9 shows an additional embodiment example of a device according to the invention with a braking means in an alternative embodiment.

In an alternative embodiment according to FIG. 9, the pig comprises a braking means in the form of a spindle-driven clamping device 30 with a spindle drive 31, via which the braking elements 32 can be shifted in the direction of the wall 2 of a pipeline. Here, the braking means can be moved via a scissor gear 35. The braking element 32 can here be shifted parallel to the wall 2 of the pipeline. Thereby, a large contact surface between the braking element 32 and the wall 2 is made possible, as a result of which the contact pressure of the braking element 32 onto the pipeline wall is smaller with the same braking effect.

FIG. 10 shows an embodiment example of a magnetically actuatable braking means for a pig 12 of a system according to the invention. FIG. 10 a shows the braking means in a braking position, in which the braking means is in contact with a wall 2 of a pipeline. FIG. 10 b shows the braking means in a transport position. The braking means comprises a magnet arrangement 36 with two pole plates 37 which are permanently magnetized. Between the pole plates 37, a permanent magnet 38 is rotatably arranged. By rotation of the permanent magnet 37, the magnetic field of the magnet arrangement can be varied. In FIG. 10b, the magnets of the magnet arrangement are oriented with their poles alternating in each case. Subsequently, the magnetic field extends substantially within the magnet arrangement. In FIG. 10a, the permanent magnet 38 is rotated by 180°. Substantial portions of the resulting magnet field of the magnet arrangement also extend outside of the magnet arrangement into the wall 2 of the pipeline. Subsequently, the braking elements of the braking means are pulled onto the wall 2 of the pipeline, whereby a pig provided with the braking means is braked and/or immobilized in the pipeline. For releasing, the permanent magnet 38 is again rotated preferably by 180°. Alternatively or additionally, the magnet arrangement can also be switched by moving one or more pole plates 37.

The braking means shown in FIG. 8 to FIG. 10 in connection with the pig 12 of a system according to the invention are not limited to the use with a pig of a system according to the invention. Said braking means can also be used on or in other pigs which are to be braked and/or immobilized in a pipeline. These pigs can be actuated via alternative means and/or they cannot be actuated at all from outside the pipeline.

The invention claimed is:

1. A method for positioning and/or communicating with a pig located in a hollow and elongate object, the method comprising the steps of:
   positioning at least one inner transducer of the pig on an inner side of a wall of the object;
   positioning at least one outer transducer on an outer side of the wall of the object;
   generating at least one ultrasound signal in the wall; and
   initiating, via the at least one inner transducer and the at least one outer transducer, a communication between the pig and a remote device external to the hollow and elongate object.

2. The method according to claim 1, wherein at least two outer transducers are arranged on an outer wall of the object spaced apart from one another in a longitudinal direction of the object, and
   wherein an ultrasound signal is generated in the wall,
   wherein, by means of an evaluation and/or communication device, at least one of:
      a relative position and/or spacing of the inner transducer with respect to the at least two outer transducers is/are derived from at least one travel time difference of the ultrasound signal and
      a second communication is initiated via the at least one inner transducer and at least two outer transducers.

3. The method according to claim 1, wherein the ultrasound signal, an additional ultrasound signal and/or a low-frequency electromagnetic signal is/are introduced from outside into the wall, said signal is received by the inner transducer, evaluated by the pig, and, on the basis of which, the pig transitions into a slow travel or a stop.

4. The method according to claim 1, wherein, for communicating/for transmitting information, the frequency and/or the phase of the ultrasound signal or multiple additional ultrasound signals between the at least one outer transducer and the at least one inner transducer is/are varied.

5. The method according to claim 1, wherein the transmission of information occurs as a function of the amplitude and/or the travel time difference.

6. The method according to claim 1, wherein, based on an amplitude of the ultrasound signal, a change thereof, a maximum thereof and/or a deviation therefrom, a positioning signal is generated for the pig and/or for a travelling unit comprising at least one outer transducer and which can be moved along on the object.

7. The method according to claim 1, wherein, on the basis of the travel time difference, a minimal and/or a no longer measurable travel time difference, a positioning signal is generated for the pig or a travelling unit comprising at least one outer transducer and which can be moved along on the object.

8. The method according to claim 6, wherein the pig actuates an active drive means or a passive drive means on the basis of the positioning signal.

9. The method according to claim 1, wherein the pig is guided by means of one or more positioning signals to a desired position where the wall is examined, cleaned, maintained and/or repaired.

10. The method according to claim 9, wherein the examination, cleaning, maintenance and/or repair is/are regulated and/or controlled on the basis of information received by the inner transducer.

11. A system for carrying out a method according to claim 1, the system comprising:
- a pig arranged in a hollow and elongate object, the pig having at least one inner transducer arranged on the inner side of the object;
- at least one outer transducer arranged on an outer side of the wall of the object, wherein the system generates at least one ultrasound signal in the wall;
- an evaluation and/or communication system for at least one of:
  - evaluating the amplitude and
  - determining a spacing A and/or a relative position of the transducer.

12. The system according to claim 11, wherein the transducers are electromagnetic ultrasound transducers (EMUS transducers) or as piezoelectric transducers.

13. The system according to claim 11, wherein the transducers are EMUS transducers, and wherein the coils have a meandering design.

14. The system according to claim 11, wherein the pig comprises at least one passive or active drive means.

15. The system according to claim 11, wherein the system comprises a travelling unit which can be moved outside on the pipeline and which includes the outer transducer.

16. The method according to claim 1, wherein, on the basis of the travel time difference, a minimal and/or a no longer measurable travel time difference, a positioning signal is generated for the pig or a travelling unit comprising at least one outer transducer and which can be moved along on the object; and
wherein the pig actuates an active drive means or a passive drive means on the basis of the positioning signal.

17. The method according to claim 1, wherein the remote device external to the hollow and elongate object is a remotely operated vehicle.

18. The method according to claim 1, wherein the communication includes data used for steering the pig.

19. The method according to claim 1, further comprising deriving, via an evaluation and/or communication device, from an amplitude of the ultrasound signal, a relative position and/or a spacing between the at least one inner transducer and the at least one outer transducer.

* * * * *